Sept. 14, 1965     A. BOGOT     3,205,843
PULVERIZED COAL FIRING SYSTEM
Filed Dec. 27, 1961
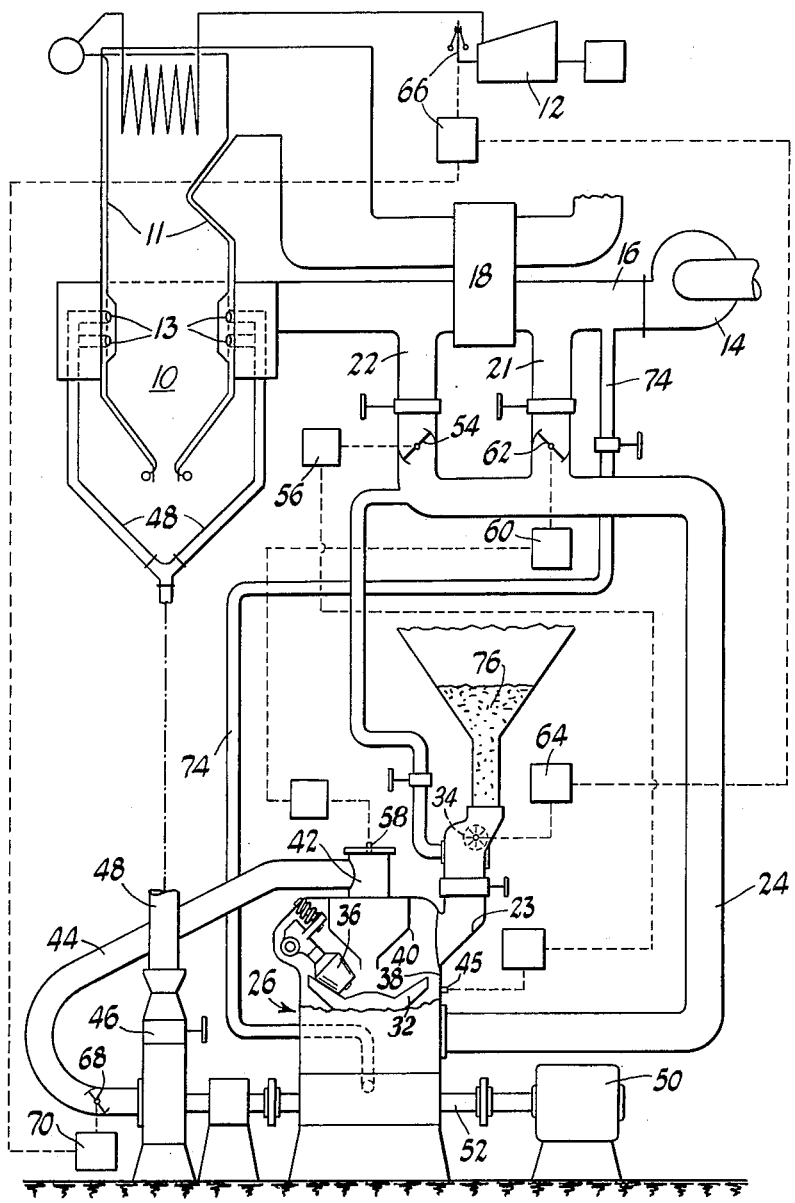
INVENTOR:
ALEXANDER BOGOT
BY
*Eldon H. Luther*
ATTORNEY

United States Patent Office 3,205,843
Patented Sept. 14, 1965

3,205,843
PULVERIZED COAL FIRING SYSTEM
Alexander Bogot, West Hartford, Conn., assignor to Combustion Engineering, Inc., Windsor, Conn., a corporation of Delaware
Filed Dec. 27, 1961, Ser. No. 162,385
15 Claims. (Cl. 110—106)

This invention relates to firing systems for pulverized coal and has particular relation to a so called suction firing system wherein the furnace and a substantial portion of the system supplying fuel and air to the furnace is operated at sub-atmospheric pressure.

In suction firing systems employing air swept pulverized mills, it has been the practice to regulate the pressure at the air inlet to the mill by means of an atmospheric regulating or balanced damper so that this pressure is slightly below atmospheric, such as minus 1.0 inch of water. The air that is admitted to the mill is heated and as a source of hot air, air is bled from the stream of air that is supplied to the furnace as secondary air with the bleed point being downstream of an air heater through which this secondary air stream is conveyed. The atmospheric regulatory damper admits air at ambient temperature and atmospheric pressure into this stream of hot air which is conveyed into the mill. Dampers are provided in the hot air duct upstream of the atmospheric balance damper and by means of these regulatory dampers and the atmospheric balance damper the temperature of the air entering the mill as well as the pressure are controlled. As a result of this arrangement it is necessary to substantially reduce the pressure of the hot air by means of operation of the regulatory dampers. This pressure drop results in a loss of efficiency in the entire firing system which may be in the order of 10 percent of the power requirement of the pulverizing mill and the fans associated therewith.

The present invention is directed to providing a more efficient pulverized coal, suction firing system than that realized heretofore. In accordance with the invention the stream of heated mill air is obtained by withdrawing air from the secondary air supply both before and after the air heater in the secondary air supply system. These two streams of hot and cold air are mixed or united to form the mill air stream which is introduced into the air inlet of the mill. The atmospheric balanced damper heretofore employed is completely eliminated and a portion of the mill is actually operated under pressure rather than suction. The pressure in the mill is regulated by a pressure sensing device which is positioned well downstream of the air inlet of the mill, preferably being at the entrance of the coal fed into the mill. At this location the pressure is maintained just slightly below atmospheric, such as minus 1.0 inch of water. This pressure is maintained by regulating the air flow in one of said streams that is joined to make up the stream of mill air. The other stream is regulated in response to the temperature of the air-coal mixture that egresses from the air swept pulverizer with the regulation of this latter air stream being such as to maintain this temperature at a desired and generally constant value. The coal-air mixture is preferably conveyed from the pulverizer to an exhauster fan which raises the pressure thereof to a desired value and conveys the same to a furnace. The supply of fuel and mill or primary air to the furnace is regulated by means of a suitable damper at the inlet of an exhauster fan with this damper being controlled in response to the load or a function of the load on the vapor generator of which the furnace forms a part.

Accordingly, it is an object of this invention to provide an improved pulverized coal, suction firing system.

Another object of this invention is to provide such an improved system wherein the efficiency of operation is substantially improved over that heretofore realized.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein the figure is a schematic representation of a firing system incorporating the present invention with the firing system being employed with and forming part of a vapor generator organization.

Referring now to the drawing, wherein like reference characters are used throughout to designate like elements, the illustrative and preferred embodiment of the invention includes a furnace 10 which is operated under suction so that the pressure within the walls of the furnace is below atmospheric. For example, the pressure in the furnace, at the zone of firing and when the furnace is in operation, may be minus 1.0 inch of water. The furnace forms part of a vapor generator and has its walls lined with heat exchange tubes 11 with the vapor generator supplying vapor to the turbine 12 which is in turn connected to a variable load, such as an electric generator (not shown).

Fuel and air is admitted to the furnace through the burners 13 which are located in the furnace walls and the combustion gas stream produced by the burning fuel passes up through the furnace and through the gas passageway connected thereto with the gases passing through an induced draft fan and then to a suitable stack.

The furnace is fired by means of pulverized coal with a stream of primary air having the pulverized coal entrained therein being supplied to each of the burners 13. In addition to this primary air, secondary air is supplied to each of the burners with the quantity of secondary air being substantially greater than that of the primary air and with the secondary air being introduced in the vicinity of coal introduction so that the air will come into intimate contact with the fuel and supporting combustion of the same.

In the firing system of the invention, secondary air is supplied to the furnace through the duct 16 with the air being forced through this duct by means of the fan 14. Interposed in duct 16 is the air heater 18 which receives as its heat source combustion gases generated by the burning of fuel in the furnace 10. The pressure of the air in the duct 16 is somewhat above atmospheric, for example, the pressure upstream of the air heater 18 may be in the order of 7.0 inches of water while that downstream thereof may be in the order of 4.0 inches of water.

The pulverized coal that is introduced into the furnace 10 is produced by means of the air swept pulverizer 26 into which crushed coal is fed with the coal being pulverized within the pulverizing mill and with air passing up through this mill and entraining the pulverized coal therein. The air which is supplied to the mill 26 must be relatively hot in order to obtain the necessary drying action in the mill which is required for proper operation of the firing system. In order to obtain a stream of heated mill air, air is withdrawn from duct 16 by means of ducts 22 and 21, which are connected downstream and upstream, respectively, of air heater 18. These ducts are connected at their outlets with the duct 24 which leads to and is connected with the air inlet of the air swept pulverizer 26. Since the air entering duct 22 is hot air, such as 600° F. while the air passing through duct 21 is at ambient temperature, such as 80° F., these two air streams may be mixed as desired to give the necessary temperature to the mill air admitted to the pulverizing mill.

In the illustrative arrangement, the air swept pulverizing mill 26 is of the so-called bowl mill type such as that disclosed in U.S. Patent 2,848,170 issued August 19, 1958, and for details of such a mill reference is made to this patent. In such a bowl mill crushed coal passes through the inlet or entrance chute 23 into the rotating bowl 32. Crushed coal is fed to the chute 23 by means of the regulatable feeder 34 which may be of the form shown in U.S. Patent 2,659,881 issued November 17, 1953, or U.S. Patent 2,305,128 issued December 15, 1942. The feeder 34 is regulated to give the necessary rate of coal feed in accordance with the demand on the vapor generator and the crushed coal thus admitted to the mill is pulverized by means of the grinding rollers 36 which are mounted within the mill housing to provide a grinding action between the roller and the grinding ring provided on the rotating bowl. There are a number of these rollers 36 (for example three) and they are pivotally mounted, being urged toward the grinding ring of the bowl by means of a suitable spring mechanism. The mill air passes up through the mill between the housing of the mill and the rim of the bowl and as it passes past the bowl, pulverized coal is entrained in this air with the air-coal mixture passing up into the classifier 40 in the upper part of the mill. This classifier is effective to separate the coarse coal fractions and return these fractions to the bowl for regrinding while the fines retained in the air stream pass through the outlet 42 at the upper end of the classifier.

From this outlet 42 the air-pulverized coal mixture is conveyed to the inlet of the exhauster fan 46 via conduit 44. The pressure of the coal-air mixture egressing from the pulverizing mill is substantially below that in the furnace as for example the pressure of the mill output may be minus 6.0 inches of water. The exhauster fan is effective to raise this pressure to a value well above that existing in the furnace, as for example, 15 inches of water, and from the exhauster fan 46 the coal-air mixture is conveyed through ducts 48 to the burners 13.

Exhauster fan 46 and bowl mill 26 are driven by the motor 50 with the drive shaft 52 extending through the housing of the bowl mill and connecting with the drive for the fan.

In the method and organization of the invention the pressure in the mill at a location well downstream of the air inlet of the mill is maintained slightly below atmospheric and for this purpose there is provided a pressure sensing device 45 which controls the flow through one of the ducts 21 or 22. In the illustrative arrangement damper 54 mounted in duct 22 is controlled in response to this pressure through the control device 56. The temperature at the outlet of the mill is sensed by means of the temperature senser 58 and through the control device 60 regulates the damper 62 in duct 21. Through the regulation of these dampers 54 and 62 both the aforementioned pressure and temperature, respectively, may be regulated. It is desired that the temperature at the mill outlet be maintained at a predetermined value.

The control of the supply of crushed coal to the mill through feeder 34 is provided by means of the regulating device 64 which is actuated in response to the load response device 66. Also controlled in response to this load responsive device 66 is damper 68 in the duct leading from the mill outlet to the inlet of the exhauster fan 46 with the regulation of this damper being affected by means of control device 70.

It is preferable to mount the pressure responsive device 45 in the wall of the mill housing generally at the location where the coal is introduced into the mill. The reason for this is that by means of providing a slight negative pressure at this location the sealing problems associated with the feeder are made much less difficult than if a pressure that varies substantially from atmospheric is provided at this location.

With the method of operation and system of the invention optimum advantage is realized from the pressure head that is necessary in the air supply duct 16 and as a result thereof an efficient operation is provided.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In a suction firing system wherein a furnace is operated at subatmospheric pressure with pulverized coal being introduced and burned therein and with secondary air being supplied thereto by means of a fan which conveys said air through a suitable heater and then into the furnace with the pressure of this air being somewhat above atmospheric and with the pulverized coal being produced by means of an air swept pulverizer the improved method of operation comprising forming a stream of heated mill air by withdrawing air from the secondary air stream at locations upstream and downstream of said air heater, regulating the pressure in the pulverizer at a location well downstream of the air inlet of the pulverizer and at a value only slightly below atmospheric by controlling the air withdrawn from one of said locations, and regulating the temperature of the air leaving said pulverizer by regulating the air withdrawn from the other of said locations, applying a suction to withdraw the discharge from the mill and thereafter raising the pressure of the discharge from the mill and introducing the same into the furnace.

2. The method of claim 1 wherein the pressure in the mill is maintained at its desired value by regulating the air withdrawn from the secondary air stream downstream of the heater.

3. A suction firing system for a furnace operated at subatmospheric pressure comprising means providing a stream of secondary air at a pressure somewhat above atmospheric, air heater means through which said stream is conveyed, an air swept pulverizing mill, means supplying mill air to said mill including means operative to withdraw air from the stream of secondary air downstream of the air heater and means to withdraw air from said stream upstream of the air heater, independent control means associated with each of these last two mentioned means, an exhauster connected with the outlet of the mill and discharging into said furnace, means responsive to the pressure in the mill at a location well downstream of the air inlet thereto and operative to control one of said independent means to control said pressure.

4. The organization of claim 3 including means responsive to the temperature of the output of the mill operative to control the other of said independent means.

5. The organization of claim 3 wherein the independent means regulated by the pressure responsive means is that which controls the air withdrawn from the secondary air stream downstream of the heating means.

6. In a suction fired vapor generator having a furnace which is supplied by pulverized coal from an air swept pulverizer and which is supplied with heated secondary air from a fan which conveys the air through an air heater, the improved method of operation comprising forming a first stream of air by withdrawing air from the stream of secondary air downstream of the air heater, forming a second stream of air by withdrawing air from the secondary air stream upstream of the air heater, joining these streams to form a stream of mill air and introducing this mill air stream into the air inlet of the air swept pulverizer, regulatingly withdrawing the discharge from the pulverizer under subatmospheric pressure, sensing the pressure in the air swept pulverizer at a location well downstream of the inlet thereof, and regulating the flow of one of the withdrawn air streams in response to this pressure to control said pressure in the pulverizer.

7. The method of claim 6 including sensing the temperature of the air-coal output of said air swept pulverizer and regulating the flow of the other withdrawn air stream in response thereto and so as to maintain said temperature at its desired value.

8. The method of claim 7 wherein said first air stream is regulated in response to the pressure sensing device and the second air stream is regulated in response to the temperature sensing device.

9. The method of claim 7 wherein said pressure is sensed at a location generally corresponding to that at which fuel is introduced into the pulverizer and wherein said one withdrawn air stream is regulated in response to this pressure so as to maintain the same at a value slightly below atmospheric.

10. The method of pulverized coal firing a furnace operating at subatmospheric pressure comprising providing a stream of combustion supporting air at somewhat above atmospheric pressure, passing said stream through a heating zone, forming a first and second air stream by withdrawing air from said stream of combustion supporting air at locations downstream and upstream of said heating zone, respectively, introducing these air streams together into an air swept pulverizing mill and conveying the same through the mill as the heated air stream therefor, introducing crushed coal into said mill and pulverizing the same therein, entraining pulverized coal in the heated air passing through the mill and applying a suction to the outlet of the mill thereby withdrawing this air with pulverized coal entrained therein from the mill, introducing this pulverized coal-air from the mill into an exhauster fan and conveying the same from the exhauster fan to the furnace, sensing the pressure in the pulverizer at a location intermediate the air inlet and the outlet thereof and in response to this pressure regulating the flow of one of said air streams to maintain this pressure at a desired value.

11. The method of claim 10 wherein the pressure in the mill is regulated so that the pressure at the zone in the mill where coal is introduced thereinto is maintained slightly below atmospheric.

12. The method of claim 10 wherein the other of said air streams in regulated so as to maintain the temperature of the air-coal leaving the mill at a desired value.

13. The method of claim 12 wherein said first air stream is regulated in response to the pressure in the mill.

14. The organization of claim 3 wherein means are provided to restrictively control the flow from the outlet of the mill to the exhauster in response to the load on the furnace.

15. The method of claim 10 including the step of regulating the flow of pulverized coal-air flowing from the pulverizer to the exhauster fan in response to the coal-air requirements of the furnace.

References Cited by the Examiner
UNITED STATES PATENTS

| | | | |
|---|---|---|---|
| 1,898,086 | 2/33 | Frisch | 110—106 |
| 2,141,604 | 12/38 | Hardgrove | 110—106 |
| 2,831,637 | 4/58 | Mittendorf et al. | 110—106 |

JAMES W. WESTHAVER, *Primary Examiner.*

FREDERICK L. MATTESON, JR., *Examiner.*